(12) United States Patent
McGhee et al.

(10) Patent No.: US 9,323,733 B1
(45) Date of Patent: Apr. 26, 2016

(54) INDEXED ELECTRONIC BOOK ANNOTATIONS

(71) Applicant: Google Inc., Mountain View, CA (US)

(72) Inventors: Steve McGhee, Danville, CA (US); Trevor Sehrer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 220 days.

(21) Appl. No.: 14/109,090

(22) Filed: Dec. 17, 2013

Related U.S. Application Data

(60) Provisional application No. 61/831,495, filed on Jun. 5, 2013.

(51) Int. Cl.
*G06F 17/24* (2006.01)

(52) U.S. Cl.
CPC .................................. *G06F 17/241* (2013.01)

(58) Field of Classification Search
None
See application file for complete search history.

(56) References Cited

U.S. PATENT DOCUMENTS

| | | | |
|---|---|---|---|
| 4,820,167 A | 4/1989 | Nobles et al. |
| 4,985,697 A | 1/1991 | Boulton |
| 5,392,387 A | 2/1995 | Fitzpatrick et al. |
| 5,877,765 A | 3/1999 | Dickman et al. |
| 6,181,344 B1 | 1/2001 | Tarpenning et al. |
| 6,340,967 B1 | 1/2002 | Maxted |
| 6,438,564 B1 | 8/2002 | Morton et al. |
| 6,590,568 B1 | 7/2003 | Astala et al. |
| 6,704,733 B2 | 3/2004 | Clark et al. |
| 6,907,407 B1 | 6/2005 | Yamanoue et al. |
| 6,957,233 B1 | 10/2005 | Beezer et al. |
| 6,980,652 B1 | 12/2005 | Braitberg et al. |
| 7,020,654 B1 | 3/2006 | Najmi |
| 7,058,902 B2 | 6/2006 | Iwema et al. |
| 7,139,977 B1 | 11/2006 | Russell |
| 7,236,966 B1 | 6/2007 | Jackson et al. |
| 7,496,856 B2 | 2/2009 | Beezer et al. |
| 7,545,940 B2 | 6/2009 | Alessi et al. |
| 7,546,524 B1 | 6/2009 | Bryar et al. |
| 7,779,347 B2 | 8/2010 | Christiansen et al. |
| 7,873,588 B2 | 1/2011 | Sareday et al. |

(Continued)

FOREIGN PATENT DOCUMENTS

| JP | 2008-033945 A | 2/2008 |
|---|---|---|
| KR | 10-2002-0006129 A | 1/2002 |

(Continued)

OTHER PUBLICATIONS

Luke Chircom, Markitup: Crowdsourced Collaborative Reading, Apr. 27, 2013, University College London.*

(Continued)

*Primary Examiner* — Kavita Padmanabhan
*Assistant Examiner* — Ahmad M El-Bkaily
(74) *Attorney, Agent, or Firm* — Fenwick & West LLP

(57) ABSTRACT

A request for annotations identifying a user, an electronic content item (e.g., an electronic book), and a portion of the electronic content item is received from a client device. A set of annotations is identified that correspond to the identified portion of the electronic content item and an unlocked subset of this set of annotations is determined based on an access history of the identified user that indicates electronic content the identified user has previously accessed. At least one annotation from the unlocked subset is sent to the client device for presentation in conjunction with the identified electronic content item.

20 Claims, 4 Drawing Sheets

(56) References Cited

U.S. PATENT DOCUMENTS

| | | | |
|---|---|---|---|
| 8,131,647 B2* | 3/2012 | Siegel | G06F 17/30038 705/57 |
| 8,239,574 B2 | 8/2012 | Keum et al. | |
| 8,352,449 B1 | 1/2013 | Parekh et al. | |
| 8,478,662 B1 | 7/2013 | Snodgrass et al. | |
| 8,504,906 B1 | 8/2013 | Xu | |
| 8,527,496 B2 | 9/2013 | Wable et al. | |
| 8,554,640 B1* | 10/2013 | Dykstra | G06Q 10/101 705/14.49 |
| 8,706,685 B1 | 4/2014 | Smith et al. | |
| 8,799,765 B1 | 8/2014 | Macinnis et al. | |
| 9,116,654 B1* | 8/2015 | Shah | G06F 3/14 709/217 |
| 9,131,339 B1* | 9/2015 | Kulfan | H04W 4/02 |
| 2002/0073177 A1 | 6/2002 | Clark et al. | |
| 2002/0082939 A1 | 6/2002 | Clark et al. | |
| 2002/0087560 A1 | 7/2002 | Bardwell | |
| 2004/0162846 A1 | 8/2004 | Nakahara et al. | |
| 2004/0201633 A1* | 10/2004 | Barsness | G06F 17/30716 715/864 |
| 2004/0205568 A1 | 10/2004 | Breuel et al. | |
| 2004/0267527 A1 | 12/2004 | Creamer et al. | |
| 2005/0132281 A1 | 6/2005 | Pan et al. | |
| 2005/0154760 A1 | 7/2005 | Bhakta et al. | |
| 2005/0193330 A1 | 9/2005 | Peters | |
| 2006/0053364 A1 | 3/2006 | Hollander et al. | |
| 2006/0182345 A1 | 8/2006 | Geidl et al. | |
| 2007/0055926 A1 | 3/2007 | Christiansen et al. | |
| 2007/0073596 A1* | 3/2007 | Alexander | G06Q 30/02 705/26.1 |
| 2007/0080500 A1 | 4/2007 | Kano | |
| 2007/0083906 A1 | 4/2007 | Welingkar | |
| 2007/0118794 A1 | 5/2007 | Hollander et al. | |
| 2007/0136657 A1 | 6/2007 | Blumenthal et al. | |
| 2007/0300260 A1 | 12/2007 | Holm et al. | |
| 2008/0066185 A1 | 3/2008 | Lester et al. | |
| 2008/0141182 A1 | 6/2008 | Barness et al. | |
| 2008/0168073 A1* | 7/2008 | Siegel | G06F 17/3002 |
| 2008/0222552 A1 | 9/2008 | Batarseh et al. | |
| 2008/0229182 A1 | 9/2008 | Hendricks et al. | |
| 2008/0229190 A1 | 9/2008 | Johnson | |
| 2008/0243991 A1 | 10/2008 | Ryan et al. | |
| 2008/0293450 A1 | 11/2008 | Ryan et al. | |
| 2008/0294674 A1 | 11/2008 | Reztlaff et al. | |
| 2009/0063157 A1 | 3/2009 | Seo | |
| 2009/0125413 A1 | 5/2009 | Le Chevalier et al. | |
| 2009/0187842 A1 | 7/2009 | Collins et al. | |
| 2010/0017701 A1 | 1/2010 | Bargeron et al. | |
| 2010/0088746 A1 | 4/2010 | Kota et al. | |
| 2010/0161653 A1 | 6/2010 | Krasnow | |
| 2010/0315359 A1 | 12/2010 | Seong et al. | |
| 2010/0324895 A1 | 12/2010 | Kurzweil et al. | |
| 2011/0029435 A1 | 2/2011 | Ronen et al. | |
| 2011/0123967 A1 | 5/2011 | Perronnin et al. | |
| 2011/0161467 A1 | 6/2011 | Li et al. | |
| 2011/0167350 A1 | 7/2011 | Hoellwarth | |
| 2011/0202606 A1 | 8/2011 | Agarwal et al. | |
| 2011/0227949 A1 | 9/2011 | Kung et al. | |
| 2011/0246502 A1 | 10/2011 | Aguera y Arcas et al. | |
| 2011/0252415 A1 | 10/2011 | Ricci | |
| 2011/0261030 A1 | 10/2011 | Bullock | |
| 2011/0276863 A1 | 11/2011 | Bhise et al. | |
| 2012/0005224 A1 | 1/2012 | Ahrens et al. | |
| 2012/0036423 A1 | 2/2012 | Haynes et al. | |
| 2012/0047455 A1 | 2/2012 | Yuan et al. | |
| 2012/0066581 A1 | 3/2012 | Spalink | |
| 2012/0077175 A1 | 3/2012 | Levisay et al. | |
| 2012/0084373 A1 | 4/2012 | Chen et al. | |
| 2012/0096094 A1 | 4/2012 | So et al. | |
| 2012/0102395 A1 | 4/2012 | Cho et al. | |
| 2012/0151397 A1 | 6/2012 | Oberstein et al. | |
| 2012/0200573 A1 | 8/2012 | Stoner et al. | |
| 2012/0204092 A1 | 8/2012 | Stoner et al. | |
| 2012/0210203 A1 | 8/2012 | Kandekar et al. | |
| 2012/0231441 A1 | 9/2012 | Parthasarathy et al. | |
| 2012/0233539 A1 | 9/2012 | Reed | |
| 2012/0236201 A1 | 9/2012 | Larsen et al. | |
| 2012/0284348 A1 | 11/2012 | Rothschild | |
| 2012/0311509 A1 | 12/2012 | Maggiotto et al. | |
| 2012/0324392 A1 | 12/2012 | Mbenkum et al. | |
| 2013/0031125 A1 | 1/2013 | Graham et al. | |
| 2013/0080968 A1 | 3/2013 | Hanson et al. | |
| 2013/0149681 A1 | 6/2013 | Tinkler et al. | |
| 2013/0239020 A1 | 9/2013 | Heo et al. | |
| 2014/0019438 A1 | 1/2014 | Le Chevalier et al. | |
| 2014/0019562 A1 | 1/2014 | Le Chevalier et al. | |
| 2014/0033030 A1 | 1/2014 | Pfister | |

FOREIGN PATENT DOCUMENTS

| | | |
|---|---|---|
| KR | 10-2005-0108231 A | 11/2005 |
| KR | 10-2010-0020246 A | 2/2010 |
| KR | 10-2011-0001105 A | 1/2011 |
| KR | 10-2011-0046822 A | 5/2011 |
| KR | 10-1051149 B1 | 7/2011 |
| KR | 10-2012-0087248 A | 8/2012 |

OTHER PUBLICATIONS

Extended European Search Report for European Patent Application No. EP 12842720.0, Mar. 19, 2015, 7 Pages.

PCT International Search Report and Written Opinion, PCT/US2013/058782, Dec. 17, 2013, 7 Pages.

PCT International Search Report and Written Opinion, PCT/US2012/034810, Jul. 29, 2013, 8 Pages.

PCT International Search Report and Written Opinion, PCT/US2012/051643, Mar. 13, 2013, 9 Pages.

PCT International Search Report and Written Opinion, PCT/US2012/023628, Aug. 22, 2012, 9 Pages.

PCT International Search Report and Written Opinion, PCT/US2012/023584, Sep. 25, 2012, 9 pages.

PCT International Search Report and Written Opinion, PCT/US2012/025438, Sep. 19, 2012, 12 pages.

PCT International Search Report and Written Opinion, PCT/US2012/025443, Sep. 10, 2012, 11 pages.

PCT International Search Report and Written Opinion, PCT/US2012/023599, Sep. 10, 2012, 9 pages.

Provisional Patent Application filed for U.S. Appl. No. 61/350,965, filed Jun. 3, 2010, 61 Pages.

amazon.com, Inc., "Amazon Kindle User's Guide" 4th Edition, 2004-2011, pp. 1-120, can be retrieved at <URL:http://kindle.s3.amazonaws.com/Kindle_User's_Guide_4th_Edition.pdf>.

BBC, "Subtext," BBC—Learning Development, 1 page, [online] [retrieved on Apr. 23, 2012] Retrieved from the internet <URL:http://www.bbcattic.org/learningdevelopment/projects_subtext.shtml>.

BBC, "Bitesize Book Notes—Give You Brain a Boost," BBC—Book Notes, 2012, 1 page, [online] [retrieved on Apr. 23, 2012] Retrieved from the internet <URL:http://www.bbc.co.uk/schools/gcsebitesize/booknotes/>.

Damm, D., et al., "SyncTS: Automatic synchronization of speech and text documents," AES 42nd International Conference, Ilmenau, Germany, Jul. 22-24, 2011, pp. 1-10.

Fenwick, et al., "Teaching Mobile Computing and Developing Software to Support Computer Science Education," ACM 2011, pp. 589-594.

Kara, et al., "Hierarchical Parsing and Recognition of Hand-Sketched Diagrams," ACM, 2004, pp. 13-22.

Koolen, C., et al., "Electronic Environments for Reading: An Annotated Bibliography of Pertinent Hardware and Software (2011)," 95 pages.

Landoni, M., "Evaluating E-books," BooksOnline'10, Oct. 26, 2010, pp. 43-46.

Landoni, M., "The Active Reading Task: E-books and their Readers," BooksOnline'08, Oct. 30, 2008, ACM, pp. 33-36.

Lei, D., "Define, translate and search for words in Google eBooks," Google Books Search, Google Inc., May 19, 2011, 3 pages, [online] [retrieved on Apr. 23, 2012] Retrieved from the internet <URL:http://booksearch.blogspot.com/2011/05/define-translate-and-search-for-words.html>.

(56) References Cited

OTHER PUBLICATIONS

Mickey, K., et al., "E-Textbooks in Higher Education," Simba Information, 2010, 69 Pages.
Murray, A., "Discover more than 3 million Google eBooks from your choice of booksellers and devices," Google Books Search, Google Inc., Dec. 6, 2010, 2 pages, [online] [retrieved on Apr. 23, 2012] Retrieved from the internet <URL:http://booksearch.blogspot.com/2010/12/discover-more-than-3-million-google.html>.
Neary, L., "Children's Book Apps: A New World of Learning," NPR, Mar. 28, 2011, 3 pages, can be retrieved at <URL:http://www.npr.org/2011/03/28/134663712/childrens-book-apps-a-new-world-of-learning>.
Socialtext, Inc., "Socialtext 5.0 Features," 2012, 2 pages, [online] [retrieved on Apr. 23, 2012] Retrieved from the internet <URL:http://www.socialtext.com/features/>.
Subtext, "Subtext User Guide," 2011, 44 pages, can be retrieved at <URL:http://www.subtext.com/downloads/Subtext-User-Guide.pdf>.
Ribiére, M., et al., "The sBook: towards Social and Personalized Learning Experiences," BooksOnline'10, Oct. 26, 2010, ACM, 6 pages, can be retrieved at <URL:http://research.microsoft.com/en-us/events/booksonline10/ribiere-etal.pdf>.
Robinson, J., et al., "Using Linked Data to Reduce Learning Latency for e-Book Readers," ESWC 2011 Workshops, LNCS 7117, 2012, pp. 28-34.
Vignoli, F., et al., "A Text-Speech Synchronization Technique with Applications to Talking Heads," ISCA Archive, Auditory-Visual Speech Processing, Aug. 7-10, 1999, 5 Pages.
Webpage for Whatever.com, 2011, 1 page, [online] [retrieved on Aug. 31, 2011] retrieved from the internet <URL: http://www.whatever.com/>.
Wilson, R., et al., "The WEB Book experiments in electronic textbook design," Journal of Documentation, 2003, pp. 454-477, vol. 59, No. 4.
ZiiLABS, "Creative Patents Found for "Drag and Drop" on Touchscreen Devices, Revealing Tabbed Web Browsing," Tech in Hiding, Aug. 7, 2009, 6 pages, [online] [retrieved on Jul. 18, 2011] Retrieved from the internet <URL: http://creative.techinhiding.com/2009/08/creative-patents-found-for-drag-and-drop-on-touchscreen-devices-suggesting-multi-tab-web-browsing/>.

* cited by examiner

INDEXED ELECTRONIC BOOK ANNOTATIONS

CROSS-REFERENCE TO RELATED APPLICATION

This application claims the benefit of U.S. Provisional Application No. 61/831,495, filed Jun. 5, 2013, entitled "Indexed Electronic Book Annotations," which is incorporated herein by reference in its entirety.

BACKGROUND

1. Technical Field

The subject matter described herein generally relates to the field of electronic content and in particular to providing annotations within electronic books.

2. Background Information

Electronic books ("ebooks") come in a variety of formats, such as the International Digital Publishing Forum's electronic publication (EPUB) standard and the Portable Document Format (PDF). Ebooks can be read using a variety of devices, such as dedicated reading devices and general-purpose mobile devices, tablet computers, laptop computers, and desktop computers. Each device includes reading software (an "ereader") that displays an ebook to a user. An ereader that enables a user to interact with an ebook is generally specific to a particular device, a particular ebook format, and/or a particular ebook.

There is a long tradition of readers adding marginalia and other annotations to books. Such annotations provide a snapshot of what readers were thinking as they read the books and can enhance both the financial and experiential value of a book.

SUMMARY

The above and other problems are addressed by a method, non-transitory computer-readable storage medium, and computer system for providing electronic content annotations. An embodiment of the method comprises receiving a request for annotations identifying a user, an electronic content item, and a portion of the electronic content item from a client device. The method also comprises identifying a set of annotations that correspond to the identified portion of the electronic content item and determining an unlocked subset of the set of annotations that are available for presentation to the identified user, based on an access history of the identified user that indicates electronic content the user has accessed. The method further comprises sending at least one annotation from the unlocked subset to the client device for presentation in conjunction with the identified electronic content item.

An embodiment of the computer system for providing electronic content annotations includes a non-transitory computer-readable storage medium storing executable computer program code and a processor for executing the computer program code. The computer program code comprises instructions for sending a request for annotations identifying the user, an electronic content item, and a portion of the electronic content item. The computer program code also comprises instructions for receiving an unlocked subset of annotations that are available for presentation to the identified user, the unlocked subset having been selected from a corpus of annotations by identifying a set of annotations from the corpus that correspond to the identified portion of the electronic content item and selecting the unlocked subset from the set of annotations based on an access history of the identified user that indicates electronic content the user has accessed. The computer program code further comprises instructions for presenting at least one annotation from the unlocked subset in conjunction with the identified electronic content item.

An embodiment of the non-transitory computer-readable storage medium stores executable computer program code for providing electronic content annotations. The executable computer program code comprises instructions for receiving a request for annotations identifying a user, an electronic content item, and a portion of the electronic content item from a client device. The executable computer program code also comprises instructions for identifying a set of annotations that correspond to the identified portion of the electronic content item and determining an unlocked subset of the set of annotations that are available for presentation to the identified user, based on an access history of the identified user that indicates electronic content the user has accessed. The executable computer program code further comprises instructions for sending at least one annotation from the unlocked subset to the client device for presentation in conjunction with the identified electronic content item.

DETAILED DESCRIPTION

The Figures (FIGS.) and the following description describe certain embodiments by way of illustration only. The embodiments described are for presenting annotations in conjunction with an electronic book ("ebook"). However, other embodiments present annotations in conjunction with other types of electronic content that contain a narrative, such as TV series, series of articles, audiobooks, and the like. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
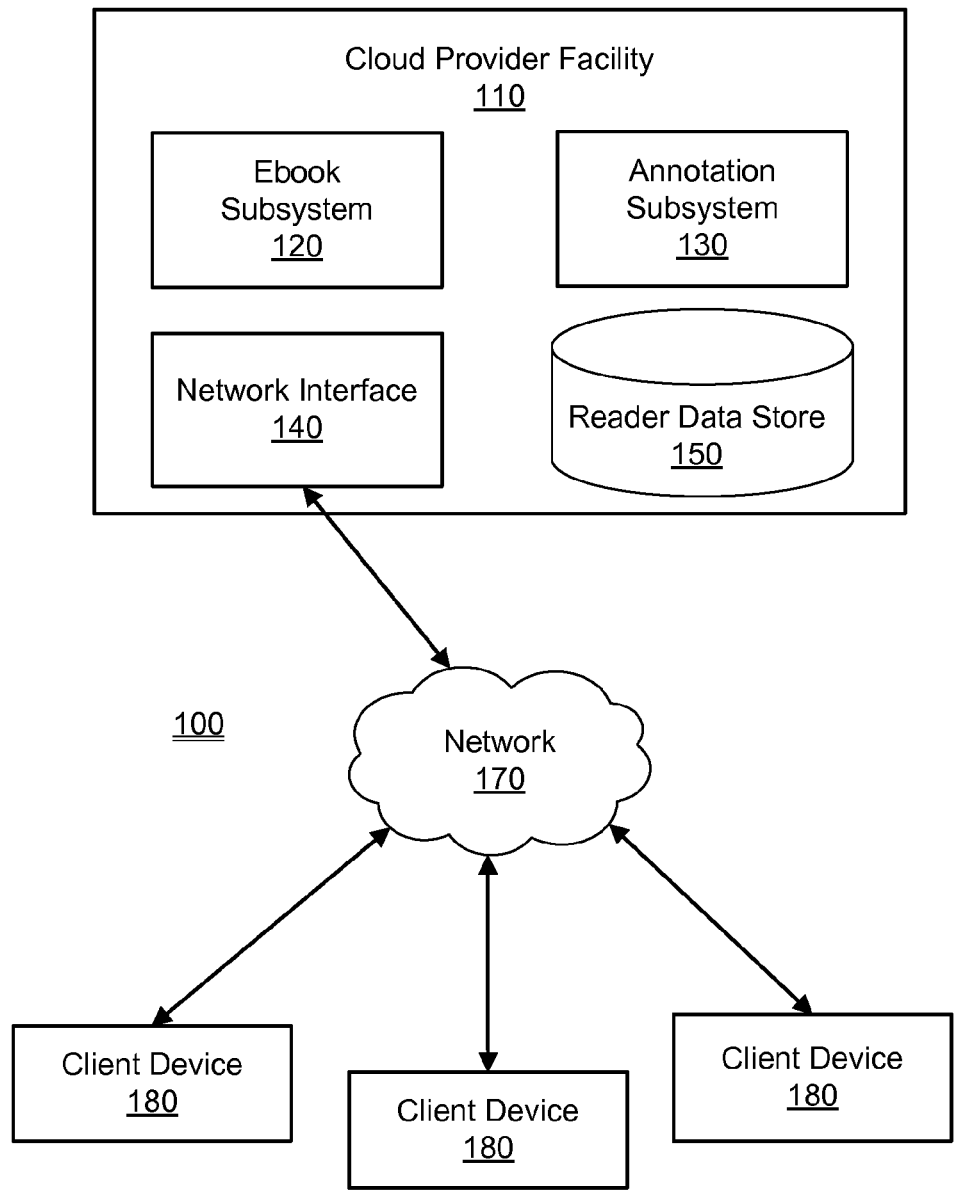
FIG. 1 is a high-level block diagram illustrating a networked computing environment for providing indexed electronic book annotations, according to one embodiment.

FIG. 1 is a high-level block diagram illustrating a networked computing environment 100 for providing indexed electronic book ("ebook") annotations, according to one embodiment. The environment 100 may be maintained by an enterprise that enables interaction with electronic books, such as a corporation, government agency, university, or other educational institution. As shown, the environment 100 includes a cloud provider facility 110, and a plurality of client devices 180. The cloud provider facility 110 and client devices 180 are connected by a network 170. Other embodiments of the networked computing environment 100 include different and/or additional components. In addition, the functions may be distributed among the components in a different manner than described herein.

In one embodiment, the network 170 uses standard communications technologies and/or protocols and can include the Internet. Thus, the network 170 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 170 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 170 can use custom and/or dedicated data communications technologies instead of, or in addition to, the ones described above.

The client devices 180 can be any computing device capable of presenting an electronic book to a reader, such as desktop PCs, laptops, smartphones, tablets, electronic book readers, and the like. As discussed above, although only three client devices 180 are shown, in practice there are many (e.g., millions of) client devices 180 that can communicate with the cloud provider facility 110 using the network 170.

The cloud provided facility 110 provides cloud computing services to the client devices 180. The cloud computing services can include providing a one-time download of software (e.g., a smartphone app) and other content, providing cloud-based software, or using a combination of both approaches (e.g., a one-time download of an electronic book reader application that displays ebook material that is stored in the cloud). In the illustrated embodiment, the cloud provider facility 110 includes an ebook subsystem 120, an annotation subsystem 130, a network interface 140, and a reader data store 150. Other embodiments of the cloud provider facility 110 include different and/or additional components. In addition, the functions may be distributed among the components in a different manner than described herein.

The network interface 140 enables the various components of the cloud provider facility 110 to communicate with each other internally, as well as with the client devices 180, via the network 170. In some embodiments, the cloud provider facility is made up of multiple computers in many different geographical locations. In such embodiments, the network interface 170 directs network traffic to an appropriate one of the computers to ensure efficient operation of the cloud provider facility 110. For example, the network interface 140 may act in a load balancing capacity, distributing requests from client devices 180 in approximately equal proportion to a plurality of servers.

The ebook subsystem 120 stores a corpus of ebooks and makes them available to readers for purchase, licensing, rental, subscription and/or free download at a client device 180, via the network 170. For example, the ebook subsystem 120 may be maintained as part of a web-based store, such as GOOGLE PLAY™. Each ebook has an ebook ID that uniquely identifies the ebook within the computing environment 100.

An ebook includes content and metadata. The ebook content includes an electronic collection of text (and possibly additional types of content such as images and/or sound). For example, the ebook content includes the content of a book such as would be printed on the pages of a traditional paper-based book. All of the text in the collection may be from a single source, or the collection may contain text from different sources. The text may have originated in a traditional paper-based format (e.g., a physical book or newspaper), or it may have originated in a digital format (e.g., electronic files in a format such as Portable Document Format (PDF), EPUB format, or flowing text format). The content of an ebook is divided into segments so that portions of the content can be transferred, loaded, and/or consumed separately. For example, an ebook can include one segment for each chapter. As used herein, the term portion is used to mean a subset of the content of an ebook, ranging from a single character to the entirety of the content, inclusive. In various embodiments, a portion is identified in one or more ways, including: position relative to the start of the content (e.g., 48.2% to 48.4% from the start of the content), absolute position in the content (e.g., page 5, paragraph 2, words 1 to 5), absolute position on a page (e.g., page 12, coordinates (12, 10) to coordinates (20, 18)), and the like.

The ebook metadata includes bibliographical information about the ebook, such as the book ID, title, author, publication date, edition/version number, number of pages, number of chapters, etc. The ebook metadata also includes a list of segments into which the ebook's content is divided. A segment is represented in the list by a segment ID that uniquely identifies the segment within the ebook (e.g., a chapter number). The ebook metadata can also indicate directly, or be used to identify, ebooks that are related to each other. Examples of related books include a plurality of books in a series of novels, a plurality of books written by the same author, a history textbook and a novel relating to the same time period, a textbook and a reference that is cited in the textbook, and the like.

The reader data store 150 stores user profile data for readers. A reader accesses the functionality provided by the cloud provided facility 110 by logging in (e.g., by providing a username and password) from a client device 180. Each reader has a user ID (e.g., the reader's username) that uniquely identifies the reader within the computing environment 100. The user ID is stored as a part of a corresponding user profile in the reader data store 150. In some embodiments, a user profile stored in the reader data store 150 includes data describing the corresponding reader's reading history, including the books the reader has previously read, as well as books the reader is currently reading and the portions of those books the reader has already read.

In situations in which the reader data store 150, client device 180, or other entities collect personal information about readers, or may make use of personal information, the readers may be provided with an opportunity to control whether programs or features collect reader information (e.g., information about a reader's social network, social actions or activities, profession, a reader's preferences, or a reader's current location), or to control whether and/or how to receive content from the cloud provider facility 110 that may be more relevant to the reader. In addition, certain data may be treated in one or more ways before it is stored or used, so that personally identifiable information is removed. For example, a reader's identity may be treated so that no personally identifiable information can be determined for the reader, or a reader's geographic location may be generalized where location information is obtained (such as to a city, ZIP code, or state level), so that a particular location of a reader cannot be determined. Thus, the reader may have control over how information about the reader is collected and used.

The annotation subsystem 130 stores a corpus of annotations that correspond to the ebooks made available to the client devices 180 by the ebook subsystem 120. The annotation subsystem also provides an interface with which the client devices 180 can access the annotations, via the network 170. In one embodiment, the annotation subsystem provides an application programming interface (API) with which an application (e.g., ereader software) running on a client device 180 can access the annotations.

In one embodiment, the annotations in the corpus are indexed by at least the corresponding ebook portions (e.g., a chapter, paragraph, sentence, word, or page position to which the annotation corresponds). The annotation subsystem 130 identifies annotations that correspond to the ebook portion identified in the request using the annotation index. A subset of the identified annotations is then determined based on the requested annotation classification and/or a comparison of the features of the reader's and the author's respective reading histories. The annotation subsystem 130 then sends the subset of the annotations to the client device 180 for display in conjunction with the ebook. In one embodiment, the features of the reader's and author's reading histories comprise a current reading position within the ebook.

A reader uses a client device 180 to download an ebook from the ebook subsystem 120 of the cloud provider facility 110, via the network 170 and network interface 140. The client device 180 sends a request to the annotation subsystem 130 for annotations that correspond to at least a portion of the downloaded ebook. The request can identify one or more annotation classifications and/or features of the reader's reading history. Alternatively, this data can be pre-obtained and stored in the reader data store 150 and accessed as required. The client device 180 receives the requested annotations and displays the annotations to the reader.

Figure 2:
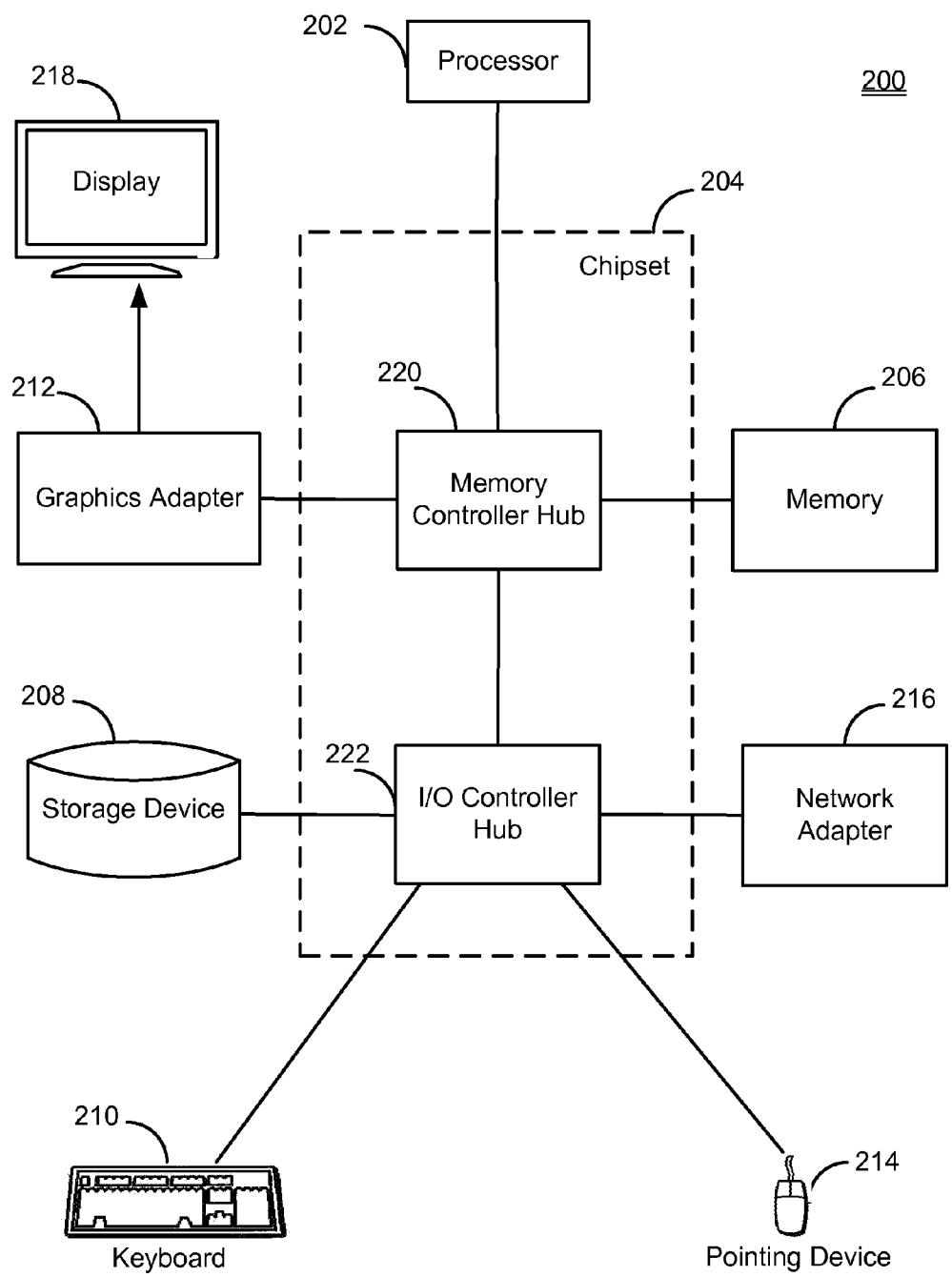
FIG. 2 is a high-level block diagram illustrating an example of a computer for use in the networked computing environment of FIG. 1, according to one embodiment.

FIG. 2 is a high-level block diagram illustrating an example of a computer 200 used in the networked computing environment of FIG. 1 as a client device 180 or as the cloud provider facility 110, or part thereof, according to one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, cloud provider facility 110 can be formed of multiple blade servers and lack a display device 218, keyboard 210, and/or other components, while the client device 180 can be a smartphone and include a touch-screen that provides on-screen keyboard 210 and pointing device 214 functionality.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
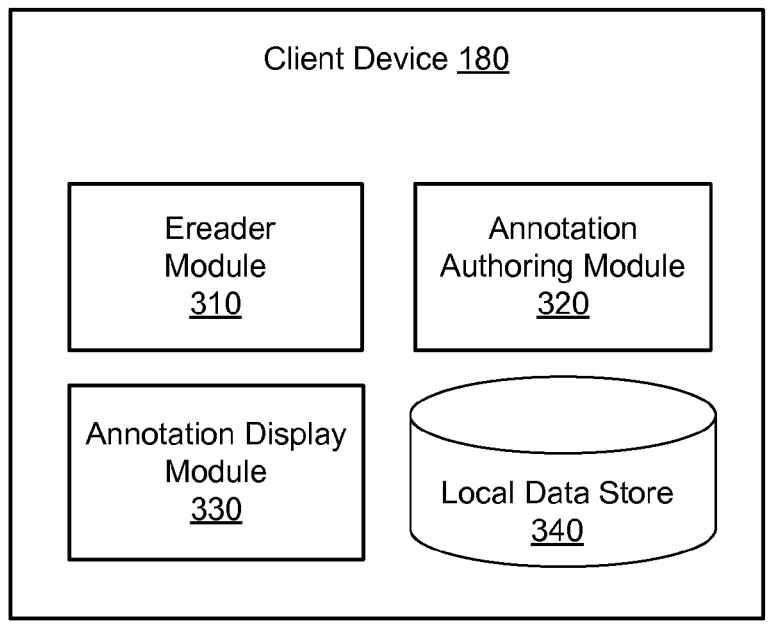
FIG. 3 is a high-level block diagram illustrating a client device suitable for use in the networked computing environment shown in FIG. 1, according to one embodiment.

FIG. 3 is a high-level block diagram illustrating a client device 180 suitable for use in the networked computing environment 100 shown in FIG. 1, according to one embodiment. In the embodiment shown, the client device 180 includes an ereader module 310, an annotation authoring module 320, an annotation display module 330, and a local data store 340. Other embodiments of the client devices 180 include different and/or additional modules. In addition, the functions may be distributed among the modules in a different manner than described herein.

The ereader module 310 presents electronic books to a reader using the client device 180. The ebook can be presented visually on a screen of the client device 180 and/or as audio book (e.g., a pre-recorded narrator reading or using text-to-speech technology). The ereader module 310 also communicates with the ebook subsystem 120 of the cloud provider facility 110 (via the network 170) in order to obtain ebooks. In one embodiment, the ereader module 310 is a JavaScript program that executes on the client device 180 in conjunction with a web browser (also executing on the client device) and obtains ebooks from the web based store provided by the ebook subsystem 120.

The annotation authoring module 320 provides a user interface in conjunction with the ebook being displayed by the ereader module 310 that enables a reader to add annotations to an ebook. The annotations include annotation content and annotation metadata. Annotation content, as used herein, is the body of an annotation that is provided by the annotation author to be displayed when the annotation is viewed by other readers, and can include text, images, audio recordings, video, and the like Annotation metadata, as used herein, is any additional information about the annotation that is stored in the networked computing environment 100, such as the specific ebook and portion thereof to which the annotation corresponds, the identity of the annotation's author, information about the annotation content (e.g., subject matter), information about the annotation's author, the date and time at which the annotation was created, and the like.

In order to add an annotation, the reader selects a portion of the ebook (e.g., by highlighting the portion using a user interface of the reader's client device 180) and provides the annotation content (e.g., by typing a text annotation using a keyboard, or taking a photograph with a smartphone's built-in camera, etc.). The annotation authoring module 320 then adds metadata to the annotation indicating that the annotation corresponds to the portion of the ebook the reader selected. Alternatively, annotations can be added in other ways, for example, the reader may provide the annotation content first and then select a portion of an ebook to which the annotation is to correspond.

In one embodiment, the annotation authoring module 320 defines the portion of ebook to which the annotation corresponds as a position range, including a start position and an end position. Each position is an internal marker for a position within an ebook and includes, e.g., a paragraph indicator and an offset within that paragraph. Some ebooks include one or more images, each of which has a specified position on a specified page. The image positions can be used to determine where a content range starts and/or ends so that images within the content range can be indicated.

The annotation metadata can also include an indication of the annotation author's reading history at the time the annotation was created to provide context for the annotation. In one embodiment, the reader data store 150 includes an indication of which portions of the ebook the annotation author read prior to making the annotation. The annotation authoring module 320 includes this indication in the annotation metadata. This provides an indication of the context in which the author is adding the annotation. For example, a set of annotations discussing a character's motives may be attached to chapter one of a book by the members of a book club. The context of an annotation in the set that was added by a reader after reading only chapter one is very different than the context of an annotation that was added by a reader who returns to the discussion having read the entirety of the ebook. In a related embodiment, the annotation authoring module 320 further includes metadata indicating portions of ebooks that are related to the ebook being annotated that have been read by the annotation author. The related books read by the annotation author may also influence the context of the annotation. In other embodiments, the metadata includes indications of portions of the ebook which the reader is required to have read before the annotation is made available for display to the reader. These required portions can be manually identified by the author and/or generated automatically by the annotation authoring module 320 based on the author's reading history. For example, certain portions of an ebook may be identified as critical (e.g., containing key plot developments) and the required portions are those critical portions that the author has read at the time the annotation is created.

In some embodiments, the metadata for an annotation also includes a classification for the annotation that identifies the type of subject matter included in the annotation content (e.g., background information, character development, plot theory, possible character motive, general discussion, historical context, etc.). In one such embodiment, the annotation authoring module 320 presents a reader with a list of available classifications when authoring an annotation (e.g., with a plurality of radio buttons) and prompts the reader to select the classification that best applies. In another such embodiment, an annotation can be assigned multiple classifications (e.g., by using a plurality of check-boxes). In one embodiment, a reader can create new classifications to assign to annotations.

In some embodiments, the metadata for an annotation also includes access permission data that determines which other readers can view the annotation, for example public (all readers), just friends (e.g., those readers the author has previously added to a list of friends), a specific group of friends (e.g., a book club), a specific individual, etc. In one such embodiment, the annotation authoring module 320 uses an application programming interface (API) provided by a social networking site (e.g., GOOGLE+™) to leverage the friends network and access permission functionality of the social networking site for this purpose.

In a related embodiment, when a reader authors a new annotation, the user interface provided by the annotation authoring module 320 includes a control to enable reader to share the annotation. The annotation authoring module 320 is configured to use the social network API to share the annotation to the reader's profile on the social networking site. In another related embodiment, readers can also share their own and/or other reader's annotations to their social network profiles at any time. However, a reader may be prevented from sharing an annotation with people who do not have permission to view the original annotation.

The annotation display module 330 obtains annotations that correspond to the ebook being displayed by the ereader module 310 and presents the annotations to the reader in conjunction with the ebook. The annotation display module 330 can obtain annotations from the annotation subsystem 130 of the cloud provider server 110, the local data store 340 of the client device 180, and/or other sources (e.g., another client device on a local network).

In one embodiment, the annotation display module 330 sends a request for annotations corresponding to a currently displayed portion of an ebook to the annotation subsystem 130 of the cloud provider server 110, via the network 170. The request includes the displayed ebook's ebook ID, an indication of the currently displayed portion (e.g., a page number), and the reader's user ID. The request can also include a set of filter criteria indicating classifications of annotation to include and/or not include, e.g., the request may specify that only annotations that are tagged as providing historical context should be included, or that annotations tagged as theories should be excluded, etc. In another embodiment, when a reader obtains an ebook, the annotation display module 330 downloads all of the annotations available to the reader for that ebook. The annotation display module 330 may also make regular checks for newly available annotations at appropriate times, such as each time the reader accesses the ebook or as part of a regular update process (e.g., once a day).

The annotation display module 330 provides an indication of portions of an ebook that have corresponding annotations (e.g., using visual effects such as highlighting, underlining, coloring, and the like). In one embodiment, different indications are used depending on the classification of the corresponding set of annotations. For example, a portion of an ebook that is annotated with historical context information may be highlighted in blue while a portion of the ebook annotated with a discussion regarding character motive may be highlighted in green, with other colors being used for additional classifications of annotation.

The annotation display module 330 presents the annotations in conjunction with the corresponding portions of the ebook displayed by the ereader module 310. In one embodiment, the annotation display module 330 provides a user interface control that enables the reader to toggle between display of the ebook content and display of the corresponding annotations (e.g., a discussion by a study group on the historical context of a passage in a set text). In this way, the reader can quickly switch between viewing a set of annotations discussing a portion of a book and the portion of the book itself. The annotation authoring module 320 may provide user interface controls to enable the reader to add an annotation while viewing a set of annotations (e.g., to add a comment to an on-going discussion). In another embodiment, the annotation display module 330 displays annotations at the same time as the corresponding portion of the ebook and provides a user interface control to toggle display of annotations on and off. For example, the annotations can be displayed in the margins near to the corresponding portion of the ebook.

The local data store 340 stores data such as executable applications (e.g., an ereader), ebooks (or portions thereof), and annotations. In one embodiment, annotations created by the annotation authoring module 320 are initially stored in the local data store 340 and later uploaded to the cloud provider facility 110 (e.g., when the reader next logs-in). In this way, the reader is not limited to authoring annotations only when on-line. In a related embodiment, the annotation display module 330 downloads and caches annotations to the local data store 340 at a time prior to the reader accessing the corresponding portions of an ebook. For example, as described above, the annotation display 330 module may download annotations corresponding to an ebook at substantially the same time that the ebook is downloaded.

Figure 4:
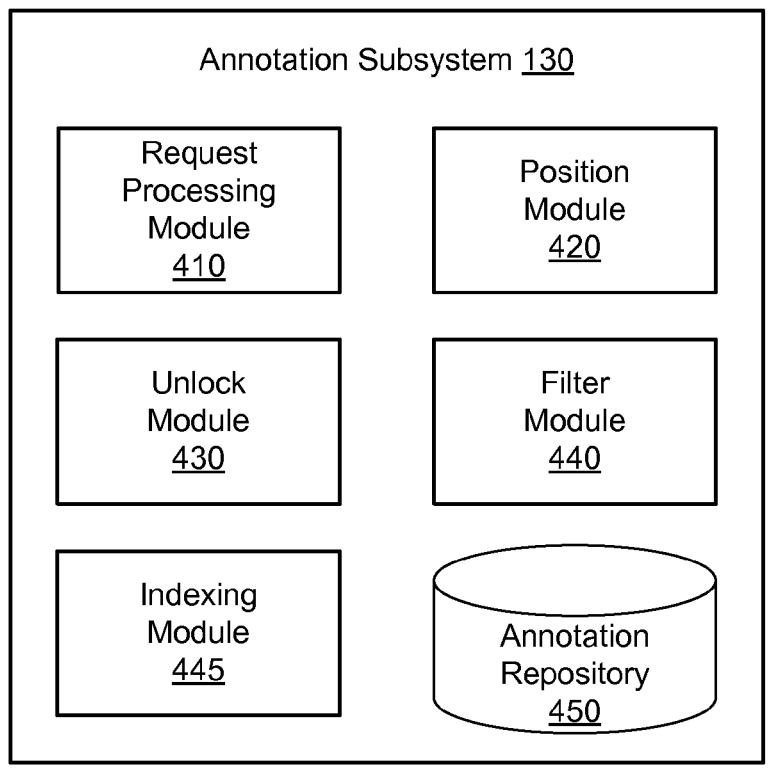
FIG. 4 is a high-level block diagram illustrating the annotation subsystem of the cloud provider facility shown in FIG. 1, according to one embodiment.

FIG. 4 is a high-level block diagram illustrating the annotation subsystem 130 of the cloud provider facility 110 shown in FIG. 1, according to one embodiment. In the embodiment shown, the annotation subsystem 130 includes a request processing module 410, position module 420, an unlock module 430, a filter module 440, an indexing module 445, and an annotation repository 450. Other embodiments of the cloud provider facility 110 include different and/or additional modules. In addition, the functions may be distributed among the modules in a different manner than described herein. For example, the filtering and unlocking of annotations may be performed by a client device 180.

The annotation repository 450 stores a corpus of annotations (including metadata) and an index of the stored annotations. In one embodiment, the annotations stored in the annotation repository 450 are indexed by corresponding ebook ID and corresponding ebook portion. In other embodiments, the annotations are indexed based on different and/or additional metadata.

The request processing module 410 receives requests from client devices 180 and processes those requests. The request processing module 410 provides an interface or interfaces with which client devices 180 create, access, and manage annotations within the networked computing environment 100. In one embodiment, the request processing module 410 processes two types of request from client devices 180: store requests and retrieve requests.

A store request includes an annotation and corresponding metadata to be added to the annotation repository 450. For example, after a reader creates an annotation, the annotation authoring module 320 sends a store request including the annotation to the request processing module 410, via the network 170. On receiving the store request, the request processing module 410 passes the request to the indexing module 445.

The indexing module 445 analyzes the annotation metadata to identify indexing data (e.g., ebook ID, ebook portion). As mentioned previously, in one embodiment, the annotations stored in the annotation repository 450 are indexed by ebook ID and ebook portion. The indexing module 445 identifies this data from the annotation metadata, adds the annotation to the annotation repository 450, and adds corresponding entries in the annotation index indicating the location of the annotation in the annotation repository and the correspondence between the annotation and the identified ebook and ebook portion. In other embodiments, the annotations are also indexed by additional aspects available in the metadata, such as the annotation context (based on the author's reading history), the annotation classification, and the like.

A retrieve request includes a set of annotation criteria for identifying annotations in the annotation repository 450 to send to a client device 180. In one embodiment, the annotation criteria include an ebook ID, a position range, a user ID, and (optionally) an indication of one or more annotation classifications. On receiving the retrieve request, the request processing module 410 queries the annotation repository 450 for annotations that correspond to the received annotation criteria. The annotation index is used to identify a set of annotations that correspond to the ebook ID and position range. The set of annotations is then further processed to identify a subset of the identified annotations that correspond to all of the annotation criteria. Correspondence between a particular annotation and the received annotation criteria is determined by comparing elements of the criteria with the metadata of the particular annotation, with a correspondence being identified if the elements match.

The request processing module 410 identifies annotations that correspond to the ebook ID included in the retrieve request. In one embodiment, an exact match is required. In another embodiment, the ebook ID need only indicate an ebook that includes at least some of the same content as the ebook identified by the particular annotation's metadata. For example, an annotation initially added to the first edition of a book is likely to be relevant when reading the second edition of the same book. The position range is similarly used to identify annotations that correspond to the portion of the ebook for which annotations were requested. Generally, an annotation is considered a match if the position range included in the retrieve request overlaps with the position range indicated by the annotation's metadata, although other match requirements may be used (e.g., at least 50% overlap between the position range included in the retrieve request and the position range indicated in the annotation's metadata).

The position module 420 identifies annotations corresponding to other instances of the ebook content identified in the retrieve request that occur in similar ebooks. Similar ebooks have at least some content in common with each other, for example different editions of an ebook, collections of short stories with some common content, and the like. In one embodiment, the position module 420 translates content locations between similar ebooks so that annotations associated with any particular instance of a portion of ebook content can be retrieved for display in conjunction with any other instance of the same portion of ebook content. For example, if a client device 180 requests annotations for a particular passage of the first edition of an ebook, any annotations corresponding to the same content in the second edition of the ebook are also likely to be of interest to the reader. However, if content has been added in the second edition, the content of the particular passage in the first edition will appear in a different relative position in the second edition of the ebook.

In some embodiments, the position module 420 determines that a portion of the ebook corresponds to a portion in a similar ebook if each portion contains substantially the same content. In this instance, substantially the same is used to mean that the two portions contain only minor differences that do not substantively affect the meaning of and/or information provided by the content. For example, two portions that differ only due to the correction of a typographical error included in a later edition of a book are considered to be substantially the same. In one such embodiment, the two portions are compared character by character and are considered substantially the same if more than a threshold (e.g., 95%) of the characters match. In other embodiments, other methods of determining whether two portions contain substantially the same content are used.

In some embodiments, the position module 420 keeps track of position information indicating correspondences between annotated portions of an ebooks and corresponding portions of similar ebooks. Position information includes, for example, a pair of ebook IDs (identifying similar ebooks) and a pair of position ranges (indicating where corresponding content can be found). Position information can also include the content before the annotated content, the annotated content itself, and the content after the annotated content. In one such embodiment, the position module 420 uses the position information to locate the annotated portion of an old version of an ebook within a new version of the same ebook by searching the text of the new version of the ebook. Thus, the portion of the new version that corresponds to the portion of the old version can be stored, and the annotation in the old version made available to reader's requesting annotations for the corresponding portion of the new version.

In another embodiment, this problem is addressed by a dedicated content tracking system (not shown) providing a content tracking service. The content tracking system keeps track of position information indicating correspondences between portions of related ebooks. The position module 420 sends a request to the content tracking system including an ebook ID and position range. In response, the content tracking system provides a set of ebook IDs and position ranges indicating corresponding content in related ebooks. In other embodiments, other methods of determining correspondences between portions of similar ebooks are used.

The unlock module 430 determines whether the user ID included in the retrieve request has unlocked access to the identified annotations, including the annotations in the book and/or in related books. An annotation is locked with regards to a particular user ID if the user ID is permitted to access the annotation, but has not yet met one or more unlock criteria associated with the annotation that relate to the reader's reading history. A locked annotation is not available for display to the reader corresponding to the user ID. The annotation becomes unlocked, and hence available for display, once the user ID has met the unlock criteria.

For a given annotation, the unlock module 430 compares the reader's reading history (either included in the retrieve request and/or retrieved from reader data store 150) to annotation metadata describing the reading history of the annotation author at the time the annotation was created to determine whether the annotation should be made available to the reader. A reading history comprises an indication of which portions of the current ebook the reader has read. The reading history may also include an indication of the reader's reading progress in related ebooks (e.g., other books in a series).

In some embodiments, a reading history for a particular ebook comprises a reading position indicator that indicates the point in the ebook that marks the divide between content that the reader has and has not read. In one such embodiment, the ereader module 310 positions this indicator at the end of the portion nearest to the end of the ebook that has been displayed for more than a threshold period of time, ranging from zero seconds (i.e., the portion has been displayed at some point) to about 120 seconds (a reasonable period of time for the reader to have read the portion). In another such embodiment, the indicator is positioned at the end of the portion nearest to the end of the ebook that has been displayed for which all preceding portions have also been displayed. In yet another such embodiment, gaze-tracking is used to more precisely determine which content the reader has read.

In other embodiments, which portions of the ebook content the reader has read is determined on a portion-by-portion basis, with one or more granularities (e.g., chapter-by-chapter, page-by-page, paragraph-by-paragraph, and the like), depending on the particular requirements of the embodiment. In one such embodiment, the ereader module 310 determines that the reader has read a particular paragraph if that paragraph has been displayed for more than a threshold period of time. In another such embodiment, the ereader module 310 uses gaze-tracking to more precisely determine which portions the reader has read.

To determine whether an annotation is unlocked, the unlock module 430 compares the reading history of the reader with the reading history of the annotation's author (determined in the manner described above with reference to the reader) at the time the annotation was created. In one embodiment, the metadata of an annotation stored in the annotation repository 450 includes an indication of the author's reading history (e.g., where in the book the author has read up to) at the time that the annotation was created and the unlock criteria include that the reader has read at least as much of the book as the author had when the annotation was created. The unlock module 430 compares the reader's current reading history to the author's reading history included in the metadata, with the annotation only being available to the reader (unlocked) if the user has read at least as much of the book as the author had at the time the annotation was created. In some embodiments, the unlock module 430 keeps track of annotations that have been displayed to the reader and/or that the reader has added annotation replies to. The unlock module 430 then notifies the reader when additional corresponding annotations have been unlocked as the reader progresses through the ebook.

For example, after reading page 4 of a book, a first reader adds an annotation to page 4 asking the other members of a book club for their thoughts regarding how the plot is likely to develop. A second reader in the book club, after reading page 4, sees the annotation and adds a reply (also an annotation) to it immediately with a prediction. Later, after reading to page 10, the first reader returns to the annotations on page 4 and adds a further reply congratulating the second reader for making a correct prediction. At a later time, a third reader reaches page 4 of the book. Because the third reader has reached page 4, but has not yet reached page 10, the unlock module 430 allows the third reader to access the annotation asking for predictions and the annotation making a prediction, but not the annotation indicating that the prediction is correct. The third reader adds a further reply making a different (incorrect) prediction. Thus, the third reader's enjoyment of the book is not spoiled by annotations that include knowledge gained from sections of the book that the third reader is yet to read. When the third reader reaches page 10 and unlocks the reply congratulating the second reader on making a correct prediction, the third reader is automatically notified that an additional annotation has been unlocked and provided with a link back to the earlier annotations (the initial annotation and the replies).

In other embodiments, additional features of readers' and authors' reading histories are used to determine whether the unlock criteria have been met and annotations are unlocked. In one embodiment, the unlock module 430 also considers other books that the reader and annotation's author have read. In this case, the unlock criteria include requiring that the reader requesting an annotation has read at least some of the other books in a series that the annotation's author had read at the time the annotation was created. For example, the unlock criteria for an annotation associated with a portion of the first book in a series may include requiring that the reader has read at least as much of the second book in the series as the author had at the time the annotation was created. In this way, the reader's enjoyment of the series is not spoiled by annotations that include information from later books in the series before the reader has had chance to read those later books.

In some embodiments, the unlock criteria used is dependent on additional factors. In one such embodiment, different unlock criteria are used for different classifications of annotation. For example, annotations classified as historical context might be unlocked for all readers, as this type of annotation provides additional information not directly obtained from the book, whereas annotations classified as theories are unlocked only when the reader has read at least as much of the book as the author had when the annotation was created, as this type of annotation is likely to contain information obtained from within the book, and thus, be more likely to spoil the reader's enjoyment of the book if revealed too early.

In another such embodiment, different unlock criteria are used for different types of book. When reading a textbook for a class, a reader will most likely be interested in all of the annotations that are available, regardless of the author's reading history. In contrast, when reading a thriller novel, the reader is unlikely to want to see an annotation in chapter 1 that reveals a key plot twist from later in the novel. Thus, the unlock criteria used for different types of ebook can be manually and/or automatically customized to the particular type of ebook. For example, a reader may customize the annotation display module 330 to use no unlock criteria for all annotations in textbooks, author reading history based unlock criteria for just annotations classified as theories in biographies, and author reading history based unlock criteria for all annotations in fiction books.

The filter module 440 filters the available annotations (e.g., those annotations that the unlock module 430 determines are unlocked) based on annotation metadata. The filter module 440 uses filter criteria that identify one or more metadata features to determine whether the annotation is made available to a reader. The filter criteria can be included in the retrieve request and/or obtained from the reader data store 150 using the provided user ID. The filter criteria may identify features that indicate a particular annotation should be provided to the reader or features that indicate that the reader should be prevented from accessing the particular annotation.

In one embodiment, the filter module 440 identifies the user profile (stored in the reader data store 150) corresponding to the user ID provided in the retrieve request. The user profile includes an indication of one or more classifications of annotation to provide to the user ID (e.g., historical context, theories, character profiles, etc.) Alternatively, the classifications of annotations to provide is included in the retrieve request. The filter module 440 uses the indicated annotation classifications as filter criteria and filters the available annotations such that only those of the identified classifications are returned to the client device 180.

In another embodiment, the filter criteria used by the filter module 440 includes access permission data. As described above with reference to FIG. 3, an annotation stored in the annotation repository 450 can include access permission data indicating which user IDs have permission to access the annotation. The request processing module 410 compares the user ID included in the retrieve request with the access permission data to determine whether the user ID has permission to access the particular annotation. In other embodiments different and/or additional filter criteria are used to identify which annotations should be sent to the client device 180.

Once the annotation subsystem 130 has identified one or more annotations that meet the criteria provided in the retrieve request, are unlocked, and/or have not been filtered out, the one or more annotations are sent to the requesting client device 180, via the network 170. Alternatively, determining whether annotations are unlocked and/or annotation filtering can be performed by the requesting client device 180. In one embodiment, all of the annotations are identified and then sent to the client device 180 in bulk. In another embodiment, corresponding annotations are sent to the client device as they are identified.

Figure 5:
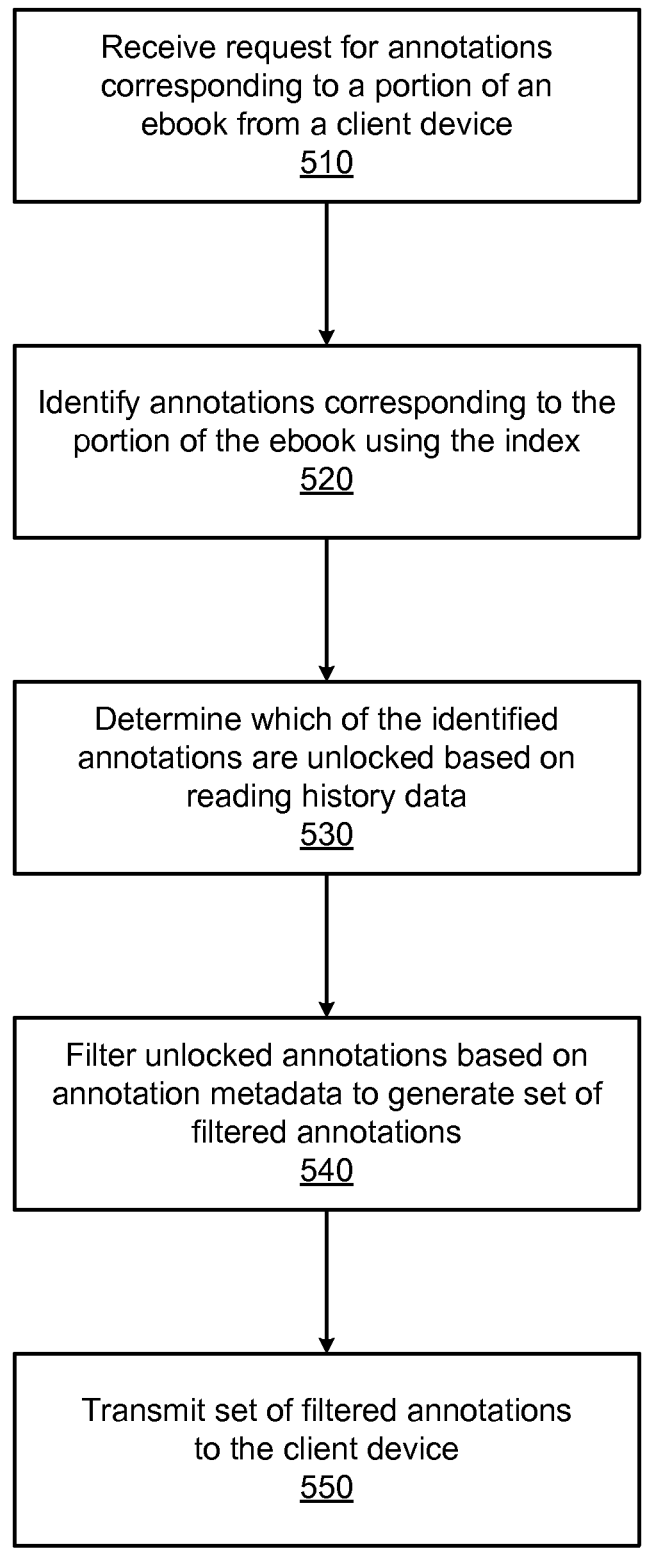
FIG. 5 is a flowchart illustrating a method for providing indexed electronic book annotations, according to one embodiment.

FIG. 5 is a flowchart illustrating a method 500 for providing indexed electronic book annotations, according to one embodiment. FIG. 5 attributes the steps of the method 500 to the annotation subsystem 130. However, some or all of the steps may be performed by other entities. In addition, some embodiments may perform the steps in parallel, perform the steps in different orders, or perform different steps. For example, the annotations may be filtered before it is determined which annotations have been unlocked.

In step 510, the annotation subsystem 130 receives a retrieve request for annotations from a client device 180. In one embodiment, the retrieve request includes an ebook ID (identifying the ebook for which annotations are requested), a position range (identifying a portion of the identified ebook for which annotations are requested), and a user ID (identifying a reader using the client device 180). The retrieve request may also contain filter criteria and/or reading history data corresponding to the reader. Alternatively, the filter criteria and/or reading history data can be retrieved from the reader data store 150 as required using the user ID.

In step 520, the annotations subsystem 130 searches the annotation repository 450 using the index to produce a set of annotations that correspond to the ebook portion identified by the ebook ID and position range included in the retrieve request. In one embodiment, the set of annotations includes annotations that are associated with corresponding portions of ebooks that are similar to the ebooks identified by the ebook ID, as described above with reference to the position module 420. In another embodiment, an annotation is only determined to correspond to the identified ebook portion if the annotation is directly associated with the ebook portion.

In step 530, the annotations subsystem 130 determines which of the set of annotations have been unlocked based on the reading history data associated with the user ID included in the retrieve request. Thus, the annotations subsystem 130 produces a subset of unlocked annotations from the set of annotations. As previously described, the reading history data may be included in the retrieve request or it may be retrieved from the reader data store 150. In one embodiment, the reading history data comprises an indication of a position in the identified ebook that the reader has read up to. This position is compared to annotation metadata indicating the reading history of the author of the annotation at the time the annotation was created. If the reading history data associated with the user ID indicates that the reader has read up to or beyond the point in the ebook that the annotation author had reached when the annotation was created then the annotation is included in the subset of unlocked annotations. Conversely, if the reader has not yet reached the point that the author had reached when the annotation was created, the annotation is considered locked and not included in the unlocked annotations subset.

In step 540, the annotation subsystem 130 filters the unlocked annotations subset to produce a subset of filtered annotations by comparing annotation metadata with filter criteria that identify one or more classifications of annotation that the reader wishes to receive. As previously described, the filter criteria may be included in the retrieve request or they may be retrieved from the reader data store 150. In one embodiment, the filter criteria include a list of annotation classifications (e.g., historical context, theories, character profiles, etc.) that the reader wishes to be displayed at the client 180. The metadata of each unlocked annotation is compared to the list, with only those annotations that are tagged with a classification that is one the list being included in the filtered annotations subset. In other embodiments, other filter criteria, such as profile information of the author are used.

At step 550, the annotation subsystem 130 sends the filtered annotations subset to the client device 180 for display to the reader in conjunction with the ebook. As described previously, in other embodiments, the steps of the method 500 are performed in different orders and by different entities. In one such embodiment, the annotation subsystem 130 sends the unlocked annotations subset to the client device 180 (i.e., the annotations subsystem does not perform the filtering step 540). The filtering step 540 is then performed by the client device 180, for example using filter parameters set by the reader using the ereader module 310 and stored locally in the local data store 340.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and process for providing indexed ebook annotations. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein. The scope of the invention is to be limited only by the following claims.

What is claimed is:

1. A computer-implemented method for providing electronic content annotations, comprising:
   receiving, from a client device, a request for annotations, the request identifying a user, an electronic content item, and a portion of the electronic content item;
   identifying a set of annotations that correspond to the identified portion of the electronic content item, the set of annotations comprising a candidate annotation authored by an author user;
   comparing a user access history indicating portions of electronic content items accessed by the identified user with an author access history indicating portions of electronic content items accessed by the author user at a creation time of the candidate annotation;
   determining that the candidate annotation is unlocked for the identified user based on the comparison of the user access history with the author access history, the unlocked candidate annotation available for display to the identified user; and
   sending the unlocked candidate annotation to the client device for presentation in conjunction with the identified portion of the electronic content item.

2. The computer-implemented method of claim 1, wherein the identified electronic content item is an ebook, and wherein the set of annotations correspond to text included in the identified portion of the ebook.

3. The computer-implemented method of claim 1, wherein identifying the set of annotations comprises:
   identifying a similar electronic content item having at least some content in common with the identified electronic content item;
   determining a portion of the similar electronic content item with substantially the same content as the identified portion of the electronic content item;
   searching an index to identify the candidate annotation in a corpus of annotations for the similar electronic content item, the identified candidate annotation corresponding to a segment having at least a threshold amount of overlap with the determined portion of the similar electronic content item; and
   including the candidate annotation in the set of annotations.

4. The computer-implemented method of claim 1, wherein sending the unlocked candidate annotation comprises:
   receiving, from the client device, a filter criterion indicating an annotation classification; and
   sending the unlocked candidate annotation to the client device in response to the unlocked candidate annotation having the classification indicated by the filter criterion.

5. The computer-implemented method of claim 1, wherein determining that the candidate annotation is unlocked comprises:

identifying a classification of the candidate annotation; and
in response to the identified classification of the candidate annotation requiring the identified user to unlock the candidate annotation by reading a required portion of the electronic content item:
identifying the required portion of the electronic content item based on metadata associated with the candidate annotation of the set of annotations;
determining whether the identified user has read the required portion based on the user access history of the identified user; and
determining that the candidate annotation is unlocked for the identified user responsive to the identified user having accessed the required portion.

6. The computer-implemented method of claim 1, wherein determining the unlocked subset comprises:
identifying portions of a second electronic content item accessed by the author user of the candidate annotation at the creation time of the candidate annotation, the second electronic content item included in a same series as the identified electronic content item;
determining whether the identified user has accessed the identified portions of the second electronic content item accessed by the author user of the candidate annotation; and
determining that the candidate annotation is unlocked for the identified user responsive to the identified user having accessed the identified portions of the second electronic content item accessed by the author user of the candidate annotation.

7. The computer-implemented method of claim 1, further comprising:
receiving, from the client device, a message indicating that a later annotation has been presented in conjunction with a later portion of the electronic content item; and
sending, to the client device, a notification that an earlier annotation has been unlocked responsive to a change in the user access history of the identified user, unlocking the earlier annotation causing the earlier annotation to become available for presentation with an earlier portion of the electronic content item before the later portion of the electronic content item.

8. An electronic device for presenting an electronic content item and annotations to a user, comprising:
a non-transitory computer-readable storage medium comprising executable computer program code for:
sending a request for annotations identifying the user, the electronic content item, and a portion of the electronic content item;
receiving a set of annotations that correspond to the identified portion of the electronic content item, the set of annotations comprising a candidate annotation authored by an author user;
comparing a user access history indicating portions of electronic content items accessed by the identified user with an author access history indicating portions of electronic content items accessed by the author user at a creation time of the candidate annotation;
determining that the candidate annotation is unlocked for the identified user based on the comparison of the user access history with the author access history; and
presenting the unlocked candidate annotation in conjunction with the identified portion of the electronic content item; and
a processor for executing the computer program code.

9. The electronic device of claim 8, wherein identifying the set of annotations from the corpus that correspond to the identified portion of the electronic content item comprises:
identifying a similar electronic content item having at least some content in common with the identified electronic content item;
determining a portion of the similar electronic content item with substantially the same content as the identified portion of the electronic content item;
searching an index to identify the candidate annotation in the corpus of annotations for the similar electronic content item, the identified candidate annotation corresponding to a segment having at least a threshold amount of overlap with the determined portion of the similar electronic content item; and
including the candidate annotation in the set of annotations.

10. The electronic device of claim 8, wherein presenting the unlocked candidate annotation comprises:
obtaining, from a store of preferences for the identified user, a filter criterion specifying an annotation classification; and
determining whether the unlocked candidate annotation has the classification indicated by the filter criterion; and
presenting the unlocked candidate annotation in response to determining that the unlocked candidate annotation has the classification indicated by the filter criterion.

11. The electronic device of claim 8, wherein selecting the unlocked subset comprises:
identifying a classification of the candidate annotation; and
in response to the identified classification of the candidate annotation requiring the identified user to unlock the candidate annotation by reading a required portion of the electronic content item:
identifying the required portion of the electronic content item based on metadata associated with the candidate annotation of the set of annotations;
determining whether the identified user has accessed the required portion based on the user access history of the identified user; and
determining that the candidate annotation is unlocked for the identified user responsive to the identified user having accessed the required portion.

12. The electronic device of claim 8, wherein selecting the unlocked subset comprises:
identifying portions of a second electronic content item accessed by the author user of the candidate annotation at the creation time of the candidate annotation, the second electronic content item included in a same series as the identified electronic content item;
determining whether the identified user has accessed the identified portions of the second electronic content item accessed by the author user of the candidate annotation; and
determining that the candidate annotation is unlocked for the identified user responsive to the identified user having accessed the identified portions of the second electronic content item accessed by the author user of the candidate annotation.

13. The electronic device of claim 8, wherein the non-transitory computer-readable storage medium further comprises executable computer program code for:
sending a message indicating that a later annotation has been presented in conjunction with a later portion of the electronic content item; and
receiving a notification that an earlier annotation has been unlocked responsive to a change in the user access history of the identified user, unlocking the earlier annotation causing the earlier annotation to become available for presentation with an earlier portion of the ebook before the later portion of the ebook.

14. A non-transitory computer-readable storage medium storing executable computer program code for providing electronic content annotations, the computer program code comprising instructions for:
receiving, from a client device, a request for annotations, the request identifying a user, an electronic content item, and a portion of the electronic content item;
identifying a set of annotations that correspond to the identified portion of the electronic content item, the set of annotations comprising a candidate annotation authored by an author user;
comparing a user access history indicating portions of electronic content items accessed by the identified user with an author access history indicating portions of electronic content items accessed by the author user at a creation time of the candidate annotation;
determining that the candidate annotation is unlocked for the identified user based on the comparison of the user access history with the author access history, the unlocked candidate annotation available for presentation to the identified user; and
sending the unlocked candidate annotation to the client device for presentation in conjunction with the identified portion of the electronic content item.

15. The non-transitory computer-readable storage medium of claim 14, wherein the identified electronic content item is an ebook, and wherein the set of annotations correspond to text included in the identified portion of the ebook.

16. The non-transitory computer-readable storage medium of claim 14, wherein identifying the set of annotations comprises:
identifying a similar electronic content item having at least some content in common with the identified electronic content item;
determining a portion of the similar electronic content item with substantially the same content as the identified portion of the electronic content item;
searching an index to identify the candidate annotation in a corpus of annotations for the similar electronic content item, the identified candidate annotation corresponding to a segment having at least a threshold amount of overlap with the determined portion of the similar electronic content item; and
including the candidate annotation in the set of annotations.

17. The non-transitory computer-readable storage medium of claim 14, wherein the computer program code further comprises instructions for:
receiving, from the client device, a filter criterion indicating an annotation classification; and
sending the unlocked candidate annotation to the client device in response to the unlocked candidate annotation having the classification indicated by the filter criterion.

18. The non-transitory computer-readable storage medium of claim 14, wherein determining that the candidate annotation is unlocked comprises:
identifying a classification of the candidate annotation; and
in response to the identified classification of the candidate annotation requiring the identified user to unlock the candidate annotation by reading a required portion of the electronic content item:
identifying the required portion of the electronic content item based on metadata associated with the candidate annotation of the set of annotations;
determining whether the identified user has accessed the required portion based on the user access history of the identified user; and
determining that the candidate annotation is unlocked for the identified user responsive to the identified user having accessed the required portion.

19. The non-transitory computer-readable storage medium of claim 14, wherein determining the unlocked subset comprises:
identifying portions of a second electronic content item accessed by the author user of the candidate annotation at the creation time of the candidate annotation, the second electronic content item included in a same series as the identified electronic content item;
determining whether the identified user has accessed the identified portions of the second electronic content item accessed by the author user of the candidate annotation; and
determining that the candidate annotation is unlocked for the identified user responsive to the identified user having accessed the identified portions of the second electronic content item accessed by the author user of the candidate annotation.

20. The non-transitory computer-readable storage medium of claim 14, wherein the computer program code further comprises instructions for:
receiving, from the client device, a message indicating that a later annotation has been presented in conjunction with a later portion of the electronic content item; and
sending, to the client device, a notification that an earlier annotation has been unlocked responsive to a change in the user access history of the identified user, unlocking the earlier annotation causing the earlier annotation to become available for presentation with an earlier portion of the ebook before the later portion of the ebook.

* * * * *